US010649147B2

(12) United States Patent
Nakanishi et al.

(10) Patent No.: US 10,649,147 B2
(45) Date of Patent: May 12, 2020

(54) OPTICAL MODULE

(71) Applicants: NTT Electronics Corporation, Yokohama-shi, Kanagawa (JP); Nippon Telegraph and Telephone Corporation, Tokyo (JP)

(72) Inventors: Tomohiro Nakanishi, Yokohama (JP); Teruaki Sato, Yokohama (JP); Motohaya Ishii, Yokohama (JP); Satoru Konno, Yokohama (JP); Yuichi Suzuki, Yokohama (JP); Shigeo Nagashima, Yokohama (JP); Shinji Mino, Yokohama (JP); Shuichiro Asakawa, Atsugi (JP); Hiroshi Fukuda, Atsugi (JP); Shin Kamei, Atsugi (JP); Shunichi Soma, Atsugi (JP); Ken Tsuzuki, Atsugi (JP); Mitsuo Usui, Atsugi (JP); Takashi Saida, Atsugi (JP)

(73) Assignees: NTT ELECTRONICS CORPORATION, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/099,955

(22) PCT Filed: May 12, 2017

(86) PCT No.: PCT/JP2017/018054
§ 371 (c)(1),
(2) Date: Feb. 5, 2019

(87) PCT Pub. No.: WO2017/195892
PCT Pub. Date: Nov. 16, 2017

(65) Prior Publication Data
US 2019/0353844 A1    Nov. 21, 2019

(30) Foreign Application Priority Data

May 13, 2016  (JP) ................................ 2016-097427

(51) Int. Cl.
*G02B 6/30*    (2006.01)

(52) U.S. Cl.
CPC .................................. *G02B 6/305* (2013.01)

(58) Field of Classification Search
CPC .................................................... G02B 6/305
See application file for complete search history.

(56) References Cited

U.S. PATENT DOCUMENTS 5,960,131 A *  9/1999  Fouquet ............... G02B 6/3538
                                                    385/16
2002/0106159 A1  8/2002  Nishimura et al.
(Continued)

FOREIGN PATENT DOCUMENTS

CN    1453599 A    11/2003
CN    1564406 A     1/2005
(Continued)

OTHER PUBLICATIONS

Machine Translation of JP-2001324647-A (Year: 2001).*
(Continued)

*Primary Examiner* — Ryan A Lepisto
(74) *Attorney, Agent, or Firm* — Workman Nydegger

(57) ABSTRACT

An optical module that is connectable to an optical fiber array and that can be packaged in a high density. Two package modules are mounted on a board, and optical waveguides in a Si photonic lightwave circuit mounted on the package module are connected to an optical fiber array fixed to an optical fiber block. Moreover, output end surfaces of the optical waveguides in the Si photonic lightwave circuit are perpendicular to a mount surface of the package module. The optical waveguides in the Si photonic light-
(Continued)

wave circuit may be tilted at an appropriate angle with respect to a direction perpendicular to a right end surface. Moreover, the optical fiber block fixes optical fibers with the optical fibers tilted with respect to a direction perpendicular to an end surface connected to the Si photonic lightwave circuit.

10 Claims, 16 Drawing Sheets

(56) References Cited

U.S. PATENT DOCUMENTS

| | | |
|---|---|---|
| 2012/0156369 A1 | 6/2012 | Kim et al. |
| 2014/0177995 A1 | 6/2014 | Mohammed et al. |

FOREIGN PATENT DOCUMENTS

| | | |
|---|---|---|
| CN | 206833034 U | 1/2018 |
| JP | H04-163405 A | 6/1992 |
| JP | H04-91311 A | 8/1992 |
| JP | H05-113517 A | 5/1993 |
| JP | H07-128545 A | 5/1995 |
| JP | 2001324647 A * | 11/2001 |
| JP | 2001324647 A | 11/2001 |
| JP | 2002-228863 A | 8/2002 |
| JP | 2003-096035 A | 4/2003 |
| JP | 2005-148538 A | 6/2005 |
| JP | 2015-069130 A | 4/2015 |
| JP | 2016024439 A | 2/2016 |
| JP | 2016-053679 A | 4/2016 |

OTHER PUBLICATIONS

Jaime Cardenas et al., *High Coupling Efficiency Etched Facet Tapers in Silicon Waveguides*, IEEE Photonics Technology Letters, vol. 26, No. 23, Dec. 1, 2014, pp. 2380-2382.

Koji Yamada et al., *Silicon Photonic Wire Waveguides for On-Chip Optical Interconnection*, Proceedings of the 67th JSAP Autumn Meeting, 31p-ZT-9, 2006, 3 pg.

International Preliminary Report on Patentability dated Nov. 22, 2018, issued in PCT Application No. PCT/JP2017/018054, filed May 12, 2017.

International Search Report dated Aug. 1, 2017, issued in PCT Application No. PCT/JP2017/018054, filed May 12, 2017.

Chinese Office Action issued in CN Application No. 201710338459. 6, dated Sep. 4, 2018.

* cited by examiner

OPTICAL MODULE

TECHNICAL FIELD

The present invention relates to an optical module including a Si photonic lightwave circuit connectable to an optical fiber.

BACKGROUND ART

Development of optical modules using Si photonic elements such as, for example, an optical modulator, an optical receiver, and a coherent optical sub-assembly (COSA) obtained by combing the optical modulator and the optical receiver is now popular. The Si photonic element is formed of a lightwave circuit in which fine optical waveguides are formed, the optical waveguides using, as a core material, silicon which is widely used as a semiconductor and which has a far greater refractive index than silicon oxide films and polymers. The optical waveguide using the Si core has a relative refractive index ten times or more than that of a conventional PLC, a mode field diameter (MFD) 1/10 or less thereby achieving strong confinement in a micron order, and a small minimum bend radius (5 µm or less). Accordingly, the Si photonic element has a characteristic of being far smaller than the conventional optical device, and an optical module such as an optical transceiver which has a smaller size and a higher density packaging than the conventional optical device is expected to be achieved.

This Si photonic element and small optical parts are usually used in combination with other optical fiber pigtail modules such as an LD module. There is a demand for size reduction not only for each of these modules but also for an entire sub-board for connecting the modules with optical fibers and packaging them in combination or an entire case for housing the modules such as, for example, a case with size restriction such as CFP2.

The Si cores of the optical waveguides in the Si photonic element are finer than cores formed by using a SiO2 film and are formed in a square each side of which is in sub-micron order. When such fine optical waveguides are simply connected to normal optical fibers, the optical coupling loss is large. Accordingly, the mode field diameter of light emitted from an end of each optical waveguide needs to be increased.

Specifically, in the Si photonic lightwave circuit, optical waveguides are integrated with the radius of curvature being about 5 and the functions of the circuit are achieved in a smaller space. In addition, more and more optical fibers and electric circuits are employing multi-array designs. However, the radius of curvature of the optical fibers is about, for example, 15 mm. Accordingly, it is necessary to reduce not only the size of the Si photonic lightwave circuit but also the size of a module group including routed portions of external optical fibers.

FIG. 11 illustrates a typical example of a conventional Si photonic element. Two package modules 1102, 1105 are mounted on the same board 1101. In this example, a Si photonic lightwave circuit 1103 is 20 mm square and is mounted on the 30 mm square package module 1102. Moreover, the Si photonic lightwave circuit 1103 is connected to an optical fiber array 1106 fixed by an optical fiber two-core ferrule (8×10 mm) 1104 which is fixed on a right side of the Si photonic lightwave circuit 1103 in the drawing. Methods of connecting a two-core optical waveguide of the Si photonic lightwave circuit 1103 to the optical fiber array 1106 include a method of fixing the optical fiber ferrule with YAG welding while interposing a lens, a method of fixing the metal-coated optical fiber with solder, and the like.

CITATION LIST

Non Patent Literature

NPL 1: Jaime Cardenas, "High Coupling Efficiency Etched Facet Tapers in Silicon Waveguides," IEEE Photon. Lett., Vol. 26, p. 2380, 2014.

SUMMARY OF INVENTION

Technical Problem

The optical waveguide of the Si photonic lightwave circuit 1103 is perpendicular to a right side edge of the Si photonic lightwave circuit 1103 and the optical fiber array 1106 is also connected perpendicularly to the right side edge. Accordingly, the optical fiber array 1106 would come into contact with the right optical module 1105. Moreover, a space for routing the optical fibers cannot be generally provided in a direction perpendicular to the substrate surfaces of the package modules 1102, 1105 due to heat dissipation and the like, and the package modules and the optical fibers cannot be laid one over the other. Accordingly, in order to route the optical fibers around the package module 1105 as in FIG. 11, the package modules 1102, 1105 needs to be arranged to be spaced away from each other by a certain distance in consideration of the radius of curvature of the optical fibers which is 15 mm. In one example of the arrangement, an interval of 27 mm or more needs to be provided between the package modules 1102, 1105.

As described above, the conventional design has a problem that, when the optical fibers are connected to the module including the Si photonic lightwave circuit, the interval between the modules is as large as the size of the modules and the modules cannot be arranged in a small space.

The present invention has been made in view of the problems described above and an object thereof is to provide an optical module which is connectable to an optical fiber array and which can be packaged in a high density.

Solution to Problem

In order to solve the aforementioned problem, the present invention provides an optical module comprising: a Si photonic lightwave circuit including an optical waveguide formed of a Si core and a $SiO_2$ cladding, the optical waveguide tilted on an output end surface at an oblique angle with respect to a direction perpendicular to the output end surface, a center of the optical waveguide on the output end surface shifted from a center of a side surface of the Si photonic lightwave circuit including the output end surface in a direction to which the optical waveguide is tilted; and an optical fiber block fixing an optical fiber array at the same oblique angle as the optical waveguide.

In another aspect of the present invention, the output end surface of the optical waveguide in the Si photonic lightwave circuit is perpendicular to a mount surface of the Si photonic lightwave circuit.

In another aspect of the present invention, the optical waveguide in the Si photonic lightwave circuit is an optical waveguide array in which a plurality of optical waveguides are arranged parallel to each other.

In another aspect of the present invention, the optical waveguide in the Si photonic lightwave circuit includes a spot size increasing portion formed of a tapered portion in which a width of the Si core decreases toward the output end surface.

In another aspect of the present invention, the oblique angle is 5 degrees or more and 50 degrees or less.

In another aspect of the present invention, the optical waveguide in the Si photonic lightwave circuit includes a waveguide with a constant width at a end point of the tapered portion in which the width of the Si core decreases toward the output end surface.

Advantageous Effects of Invention

In the present invention, an optical module which is connectable to an optical fiber array can be packaged in a high density.

DESCRIPTION OF EMBODIMENTS

Embodiments of the present invention are described below in detail.

Embodiment 1

Figure 1:
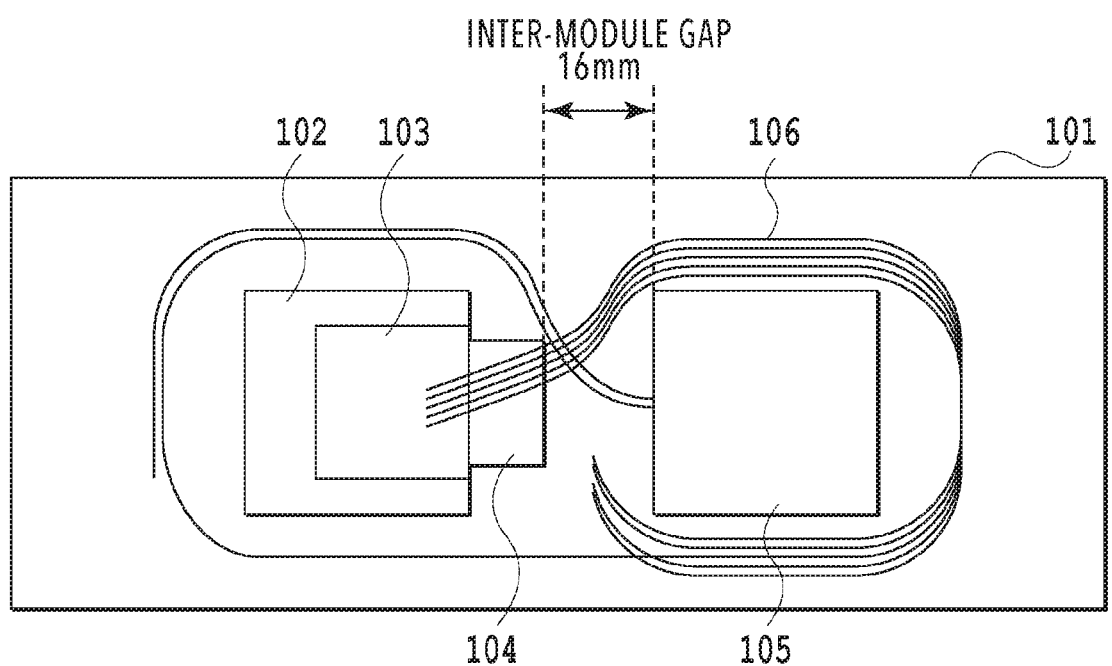
FIG. 1 is a view illustrating a configuration of optical modules according to Embodiment 1 of the present invention.
Figure 11:
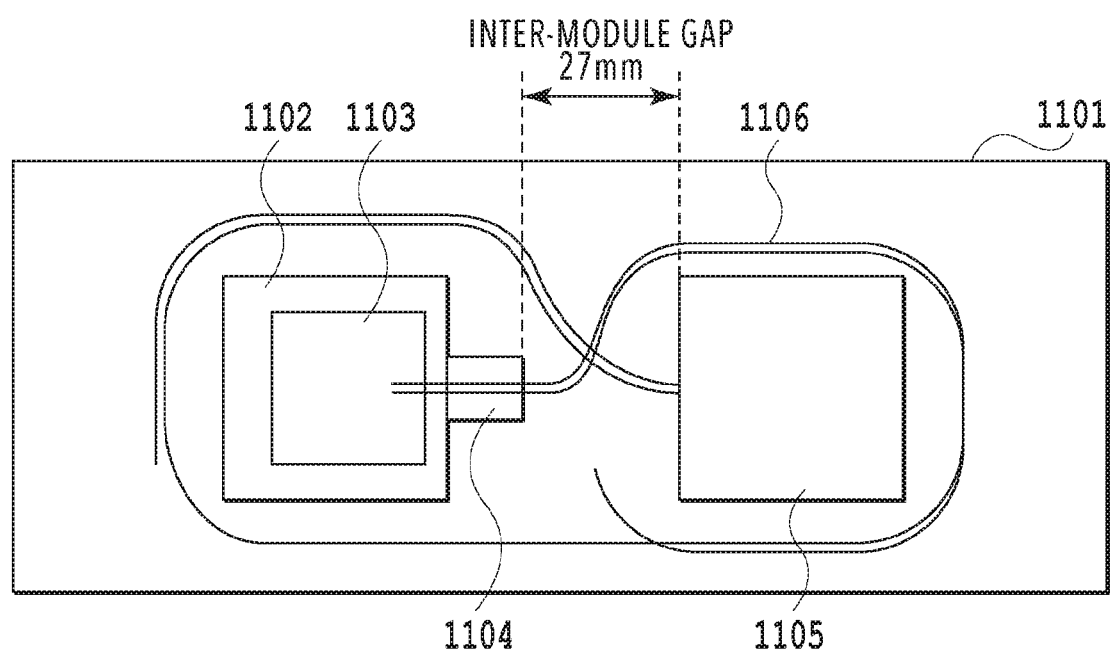
FIG. 11 is a view illustrating a typical example of a conventional Si photonic element.

FIG. 1 illustrates a configuration of optical modules according to Embodiment 1 of the present invention. In the embodiment, as in the configuration of FIG. 11, two 30 mm square package modules 102, 105 are mounted on a board 101, and optical waveguides of Si photonic lightwave circuit 103 in a 20 mm square mounted on the package module 102 are connected to an optical fiber array 106 fixed to an optical fiber block (15×10 mm) 104. Moreover, output end surfaces of the optical waveguides in the Si photonic lightwave circuit 103 are perpendicular to a mount surface of the package module 102 which is a surface on which the board 101 and the package module 102 are in contact with each other or to a mount surface of the Si photonic lightwave circuit 103 on which the package module 102 and the Si photonic lightwave circuit 103 are in contact with each other. In this case, the position of a center waveguide or the center between optical waveguides at both ends on the end surface is set at the center (point 15 mm away from upper and lower ends) of the right side edge of the package module 102 which is the output end surface, as in the configuration of FIG. 11 for comparison with the conventional example.

Meanwhile, in the embodiment, the optical waveguides in the Si photonic lightwave circuit 103 are tilted at an appropriate angle, for example, 20 degrees with respect to a direction perpendicular to the right end surface. Moreover, the optical fiber block 104 fixes optical fibers with the optical fibers tilted at 20 degrees with respect to a direction perpendicular to an end surface connected to the Si photonic lightwave circuit 103.

As described later, the MFD of the optical waveguides in the Si photonic lightwave circuit 103 is increased at the end surface to be set to the same field diameter as the optical fibers. Accordingly, the optical waveguides in the Si photonic lightwave circuit 103 and the optical fibers are tilted at the same angle with respect to the direction perpendicular to the connection end surface and can be connected to one another on the same straight lines. Using the Si photonic lightwave circuit 103 and the optical fiber block 104 as described above can greatly reduce the inter-package gap between the package modules 102, 105, which is 27 mm in the conventional example illustrated in FIG. 11, to 16 mm and reduce the inter-package gap to about half the package module length which is 30 mm.

Embodiment 2

Figure 2:
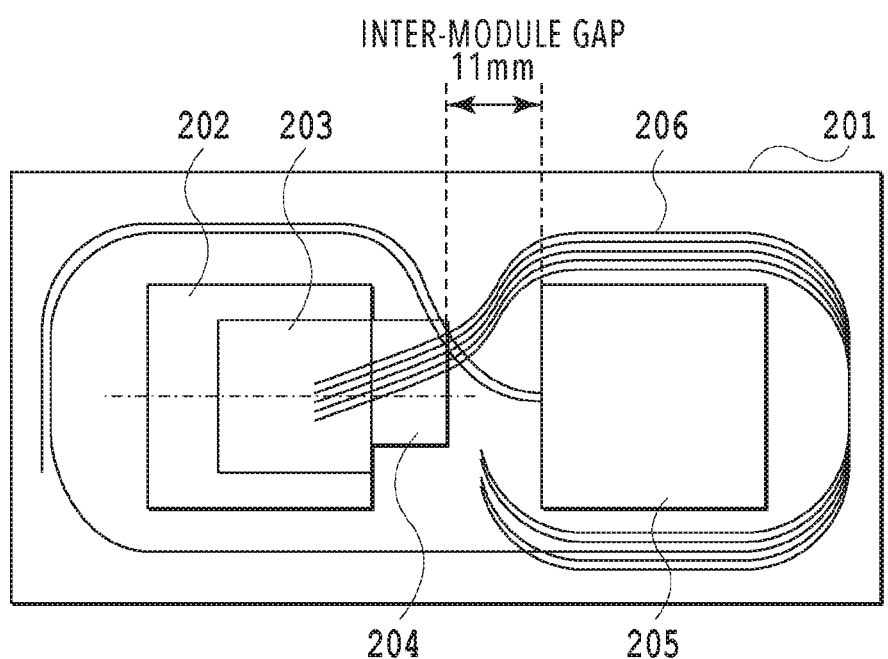
FIG. 2 is a view illustrating a configuration of optical modules according to Embodiment 2 of the present invention.

FIG. 2 illustrates a configuration of an optical module according to Embodiment 2 of the present invention. In the embodiment, as in Embodiment 1, two 30 mm square package modules 202, 205 are mounted on a chassis 201, and optical waveguides in a 20 mm square Si photonic lightwave circuit 203 mounted on the package module 202 is connected to an optical fiber array 206 fixed to an optical fiber block (15×10 mm) 204.

In Embodiment 2, the positions of the optical waveguides in the Si photonic lightwave circuit are shifted from a portion around the center of the package module to the side to which the optical waveguides are tilted (upper side in the drawing) to further reduce the gap between packages from that in the configuration of Embodiment 1. As illustrated in FIG. 2, a center optical waveguide in the Si photonic lightwave circuit 203 is shifted from the center of the right side edge which is an output end surface of the package module 202 to the upper side of the drawing by 5 mm, and the optical fiber block 204 is similarly shifted to the upper side of the drawing by 5 mm. This can reduce the gap between the package modules 202, 205 from 16 mm to 11 mm.

Figure 3:
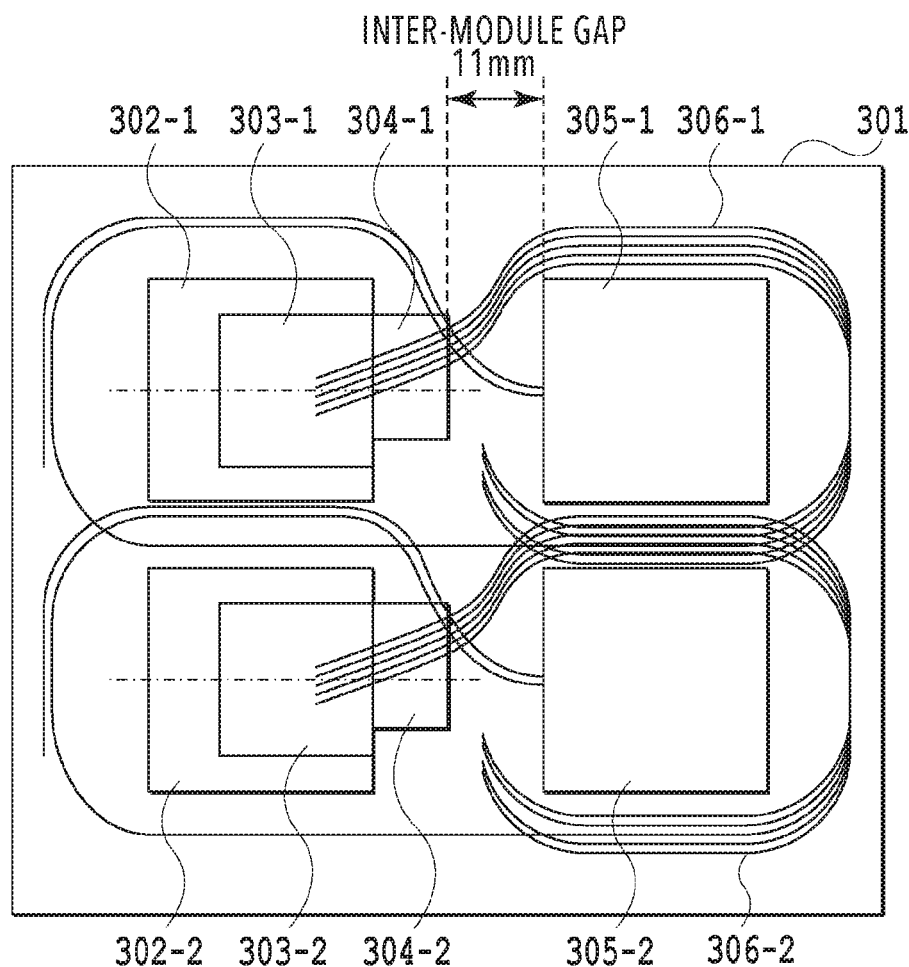
FIG. 3 is a view illustrating a configuration in which two of the configurations illustrated in FIG. 2 are mounted on the same chassis 301.

FIG. 3 illustrates a configuration in which two of the configurations of FIG. 2 are mounted on one chassis 301. Using the optical module of the present invention in this way enables higher-density packaging.

Figure 4A:
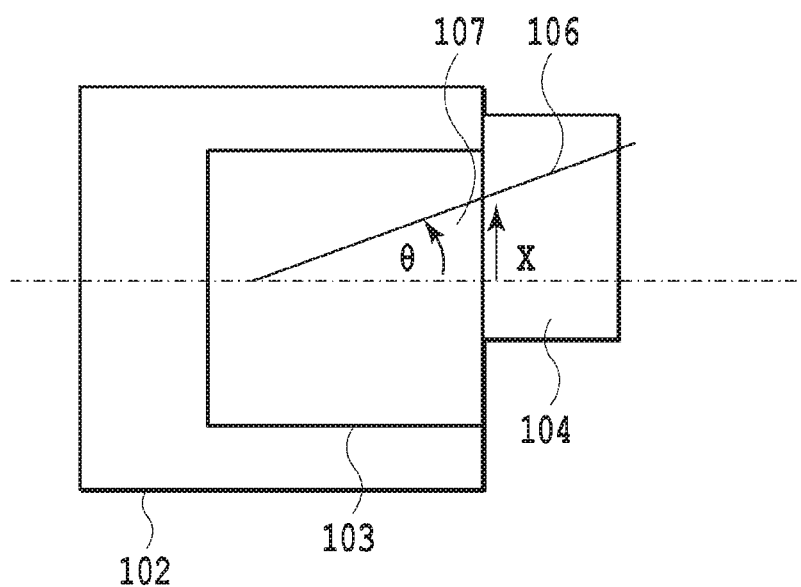
FIG. 4A is a view illustrating a connection portion between an optical waveguide of a Si photonic lightwave circuit and an optical fiber block.
Figure 4B:
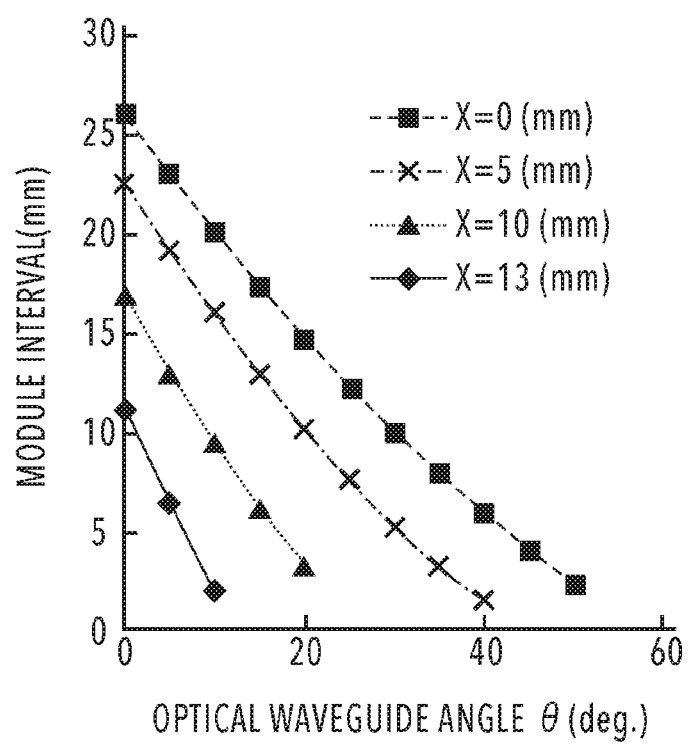
FIG. 4B is a view illustrating a module interval at each oblique angle θ in the case where the minimum bent radius of an optical fiber is 15 mm.

FIG. 4A illustrates a connection portion between the optical waveguide in the Si photonic lightwave circuit and the optical fiber block and FIG. 4B illustrates a module interval at each oblique angle θ. The results of FIG. 4B are obtained by calculation, where the oblique angle of the optical waveguide and the optical fiber is referred to as θ, the distance of an optical waveguide output position from a dotted line is referred to as X, and the minimum bend radius of the optical fiber is set to 15 mm. In order to minimize the inter-module gap, the optical fiber has the minimum bend radius at bends between the package modules which are at least first two bends from the optical fiber block side along the optical fiber. The configuration illustrated in FIG. 1 corresponds to a configuration where X=0 mm, θ=20 degrees and the configuration illustrated in FIG. 2 corresponds to a configuration where X=5 mm, θ=20 degrees.

When modules are to be housed in an actual board or a chassis such as a second-generation CFP2 (width 41.5 mm×length 106 mm×height 12.4 mm) which is one of optical transceiver standards for 100 Gb/s transmission, there is sometimes a demand for reducing the board size even by 1 mm. As illustrated in FIG. 4B, when the optical waveguide output position is shifted from the center position (X=0 mm) of the package module and the optical waveguide is tilted in the same direction as the direction in which the optical waveguide output position is shifted, the optical module interval can be reduced. Moreover, it is preferable to tilt the optical waveguide at 5 degrees or more for size reduction.

Meanwhile, when the optical waveguide is tilted at 50 degrees or more, there is a risk of optical axis misalignment due to variations in adhesive layer thickness or the like.

Accordingly, tilting the optical waveguide at an angle of 5 degrees to 50 degrees can reduce the module interval between the optical modules and is advantageous in manufacturing a high-density packaging board.

Figure 5A:
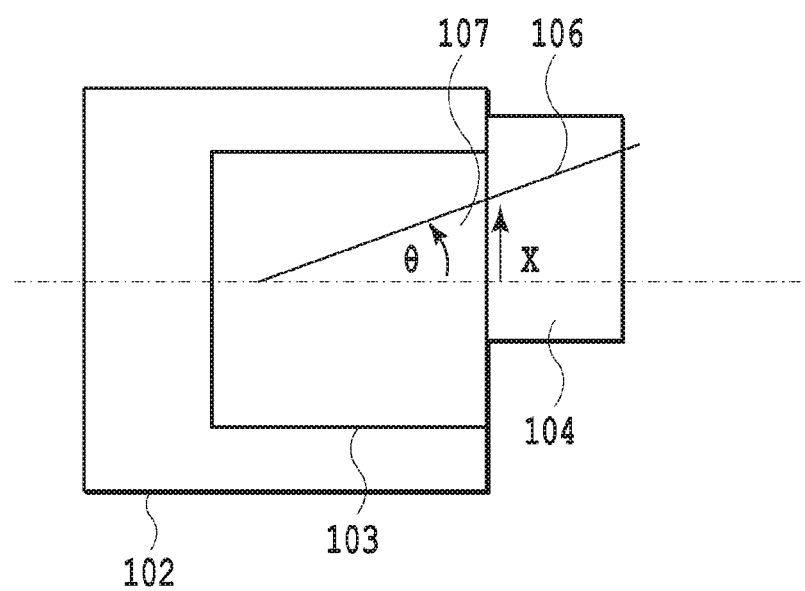
FIG. 5A is a view illustrating the connection portion between the optical waveguide of the Si photonic lightwave circuit and the optical fiber block.
Figure 5B:
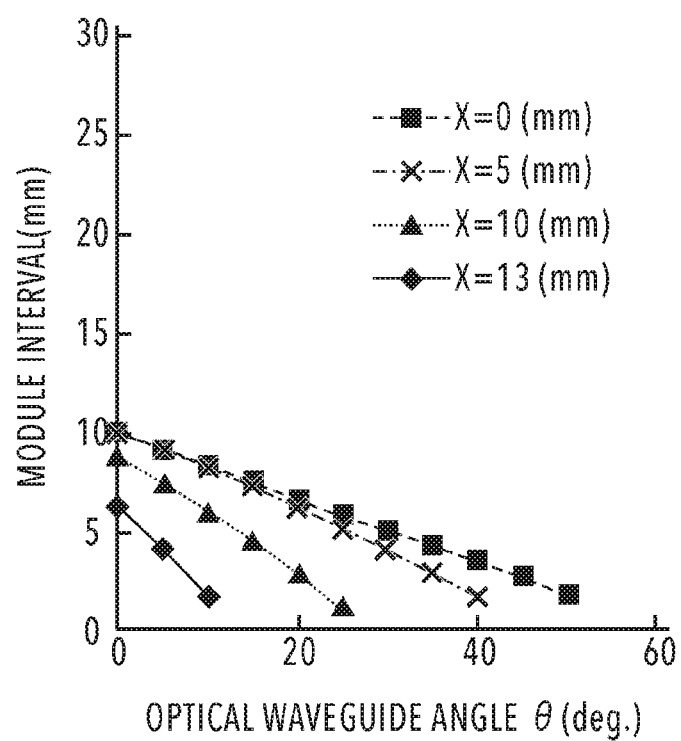
FIG. 5B is a view illustrating a module interval at each oblique angle θ in the case where the minimum bent radius of the optical fiber is 5 mm.

FIG. 5A illustrates the connection portion between the optical waveguide of the Si photonic lightwave circuit and the optical fiber block and FIG. 5B illustrates the module interval at each oblique angle θ in the case where the minimum bend radius of the optical fiber is set to 5 mm. Also in this case, in order to minimize the inter-module gap, the optical fiber has the minimum bend radius at bends between the package modules which are at least first two bends from the optical fiber block side along the optical fiber. Effects similar to those in the case where the minimum bend radius 15 mm are obtained.

<Spot Size Change Portion>

Figure 6A:
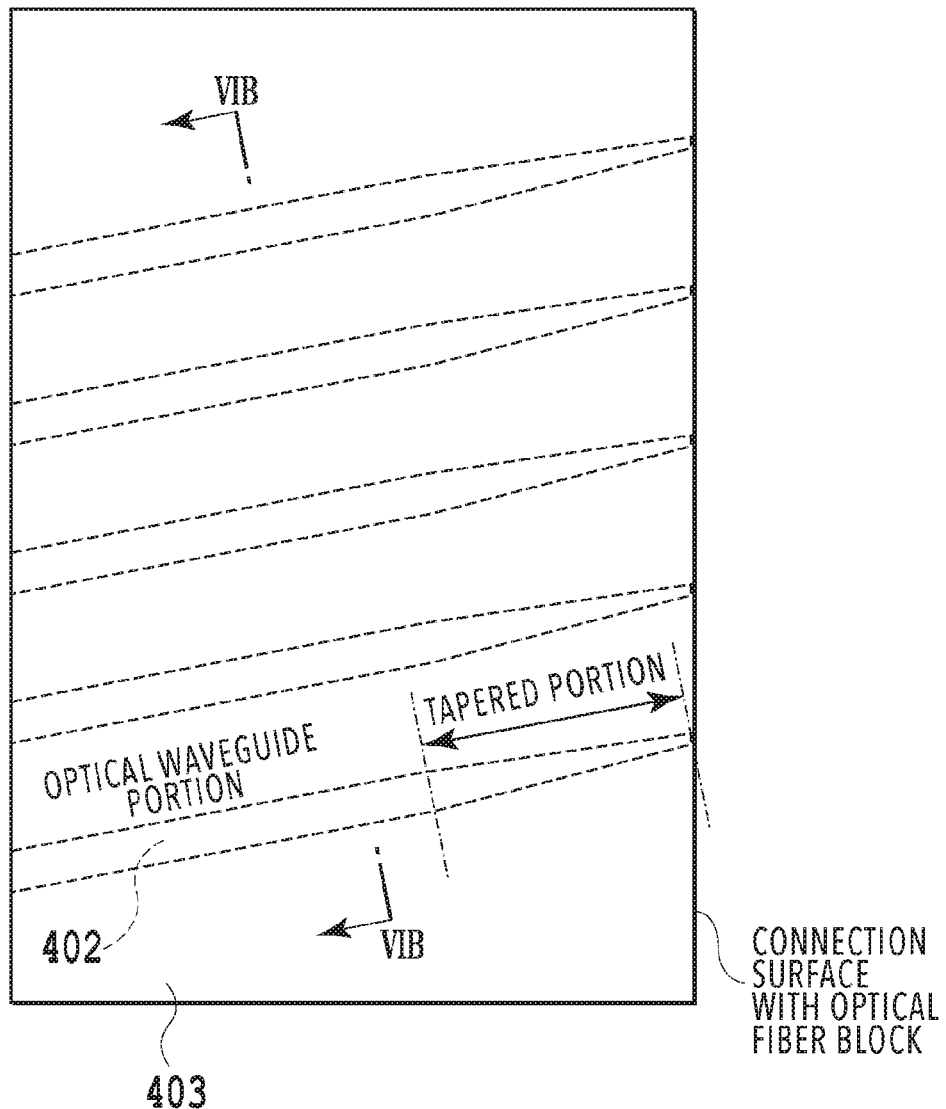
FIG. 6A is a view illustrating an enlarged view of an optical waveguide array in the Si photonic lightwave circuit.
Figure 6B:
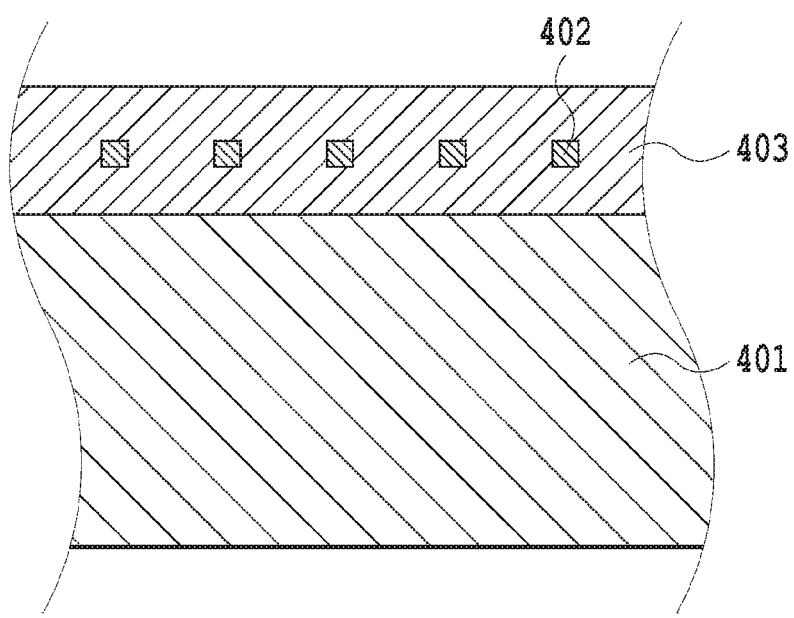
FIG. 6B is a view illustrating a cross-sectional view of the optical waveguide array in the Si photonic lightwave circuit.

FIG. 6A illustrates an enlarged view of the optical waveguide array in the Si photonic lightwave circuit. Moreover, FIG. 6B illustrates a cross-sectional view of the optical waveguide array in the Si photonic lightwave circuit. Optical waveguides formed of Si cores 402 and a SiO2 cladding 403 are formed on a Si substrate 401. The width of each optical waveguide is 500 nm, the length of each tapered portion is 100 and the width of a front end of each tapered portion is about 160 nm (see Non-patent Literature 1). In this spot size change portion, the MFD is increased to 5.0 μm near the output end surface.

Figure 7A:
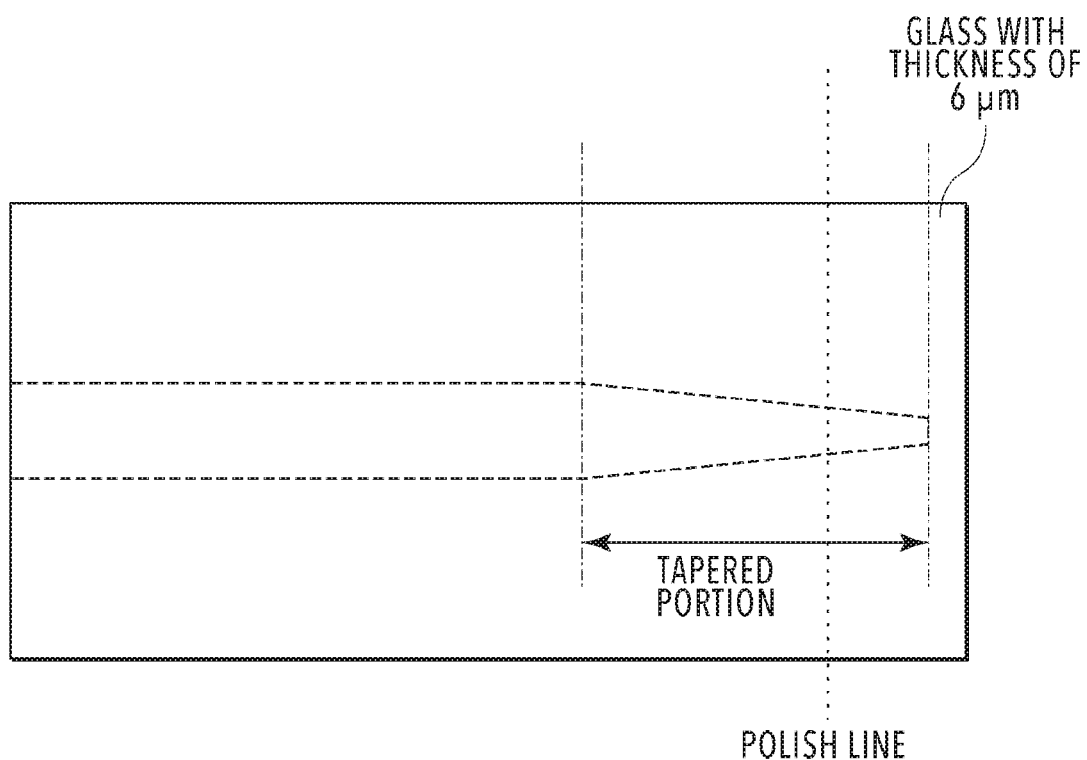
FIG. 7A is a view illustrating a configuration of a spot size change portion.
Figure 7B:
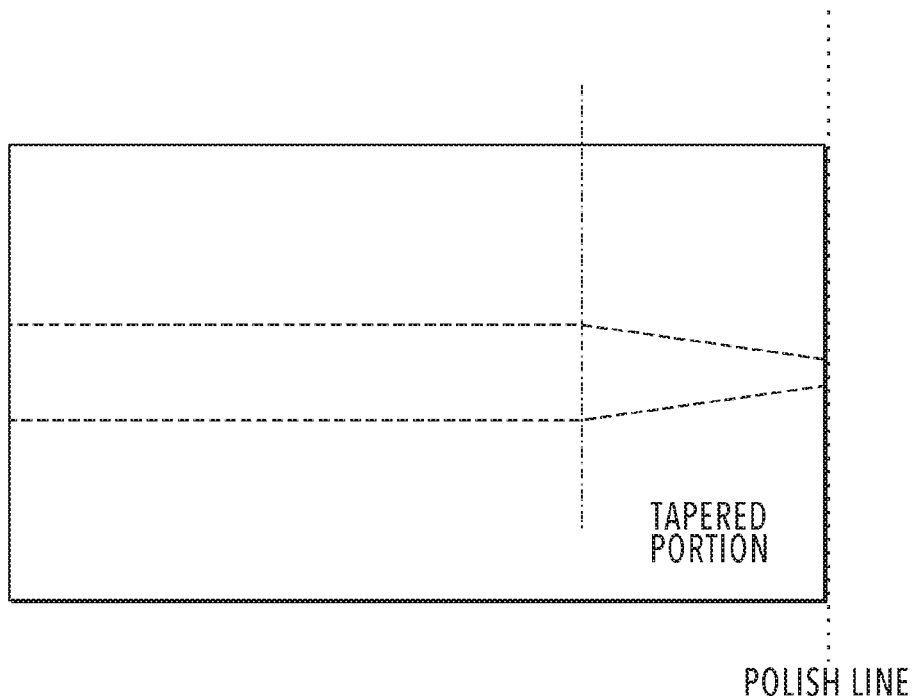
FIG. 7B is a view illustrating the configuration of the spot size change portion.

A piece of glass (glass with a thickness of 6 μm) may be provided at a front end of the spot size change portion as illustrated in FIG. 7A and the front end of the spot size change portion may be processed by means such as polishing or dicing into a shape as illustrated in FIG. 7B.

Figure 8A:
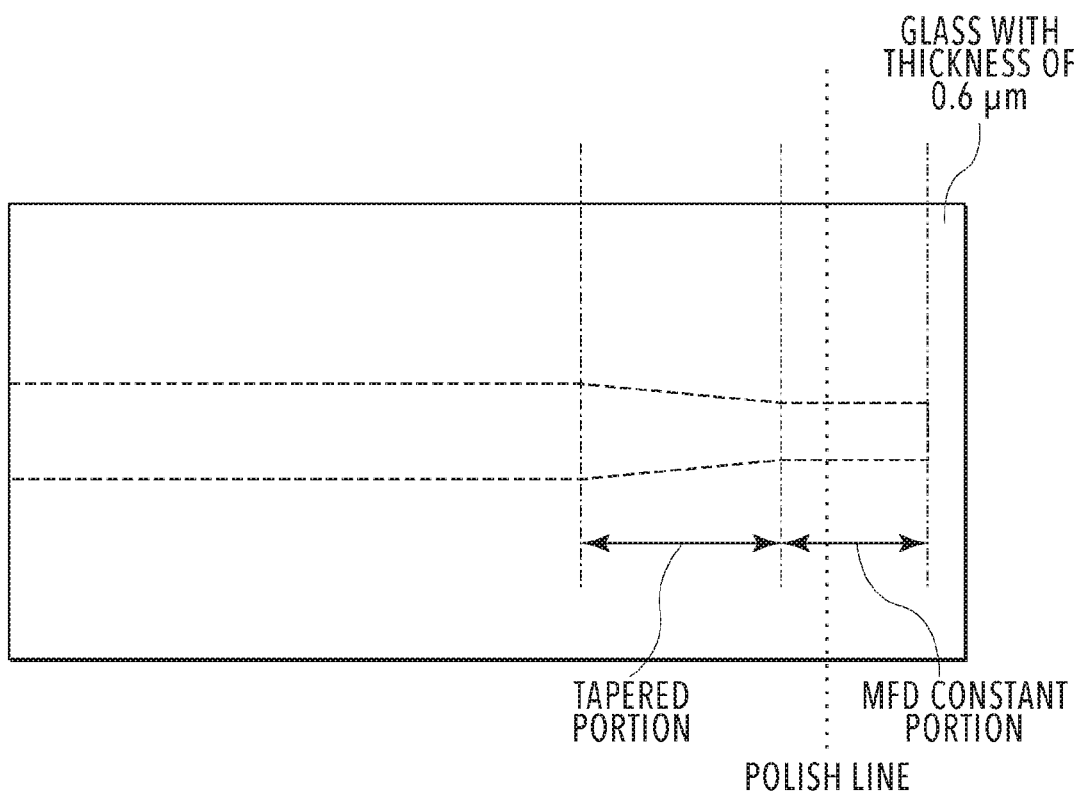
FIG. 8A is a view illustrating a configuration of a spot size change portion having a structure with a constant width at a tapered front end.
Figure 8B:
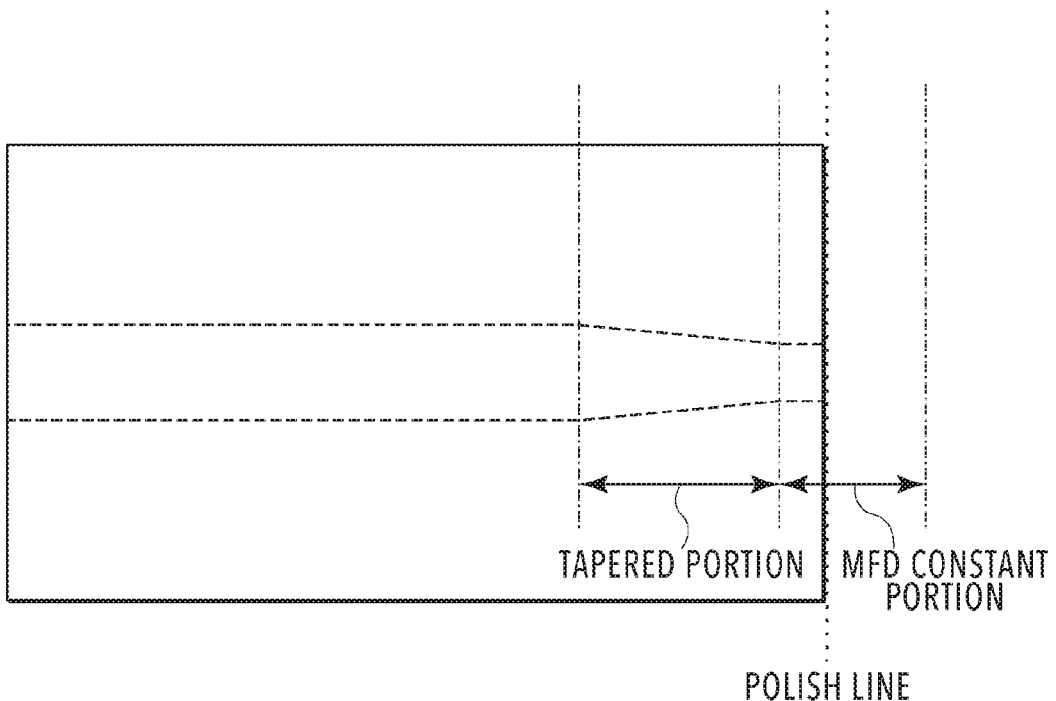
FIG. 8B is a view illustrating the configuration of the spot size change portion having the structure with the constant width at the tapered front end.

However, the structure as in FIG. 7B has a risk that, when the end surface position varies due to variation in processing position, this variation causes the width of the tapered front end to vary and thereby cause the output MFD to also vary. Accordingly, as illustrated in FIG. 8A, a structure in which the width is uniform is provided at the tapered front end. In such a structure, performing processing such as polishing on a portion with the structure in which the width is uniform can make the width of the optical waveguide in the processed output end surface uniform even if the grinding depth from the right side varies. In this structure, the spot size can be increased without deviation of the MFD from a design value even when the processing position varies.

Spot size increasing portions with such a shape have been conventionally proposed and are limited to those for lens coupling in a space. These spot size increasing portions require core alignment and the like for each optical waveguide. Accordingly, applying such a structure to the optical waveguide array is not easy and the manufacturing cost is high (see Non-patent Literature 1).

Meanwhile, a method using UV adhesive fixation described in Embodiment 1 has been used to manufacture a product having up to several tens of cores of silica-based optical waveguides and is low cost and highly reliable.

<Si Photonic Lightwave Circuit-Optical Fiber, Oblique Waveguide, Anti-Reflection Effect>

Figure 9:
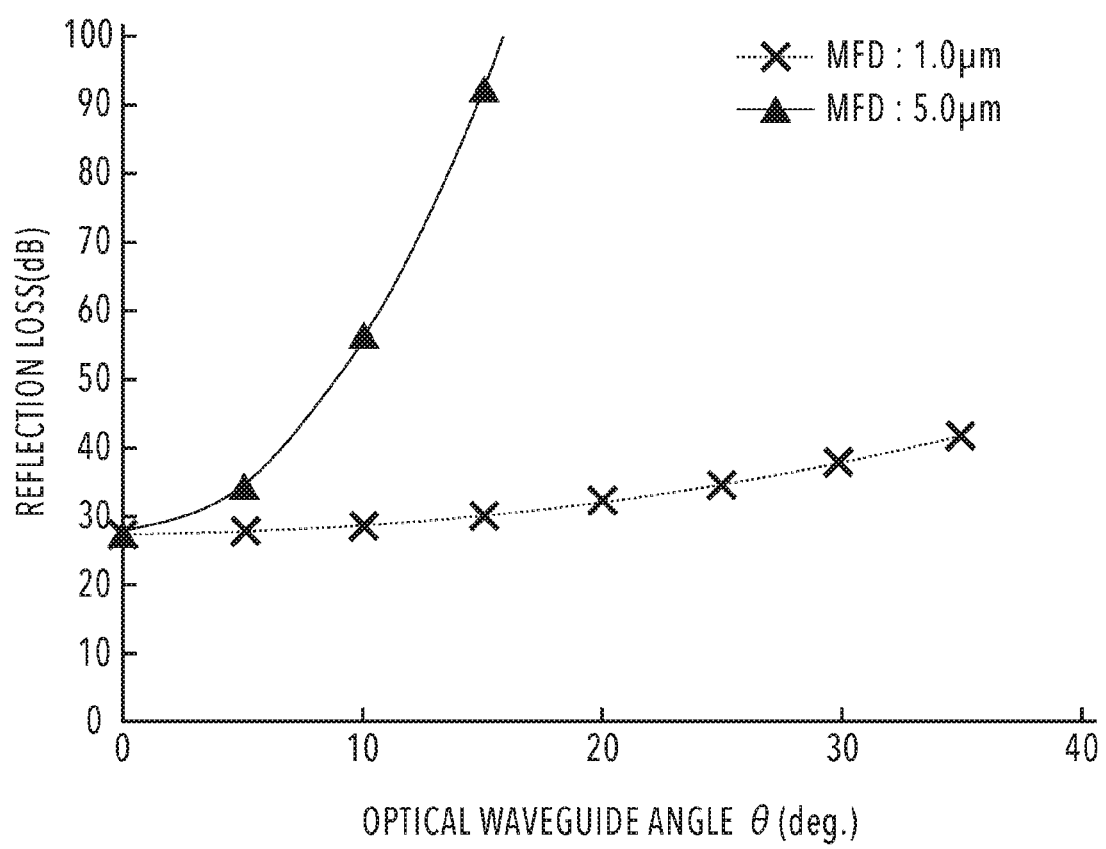
FIG. 9 is a view illustrating dependence of a reflection loss on an optical waveguide angle in each of a Si optical waveguide which has a MFD of 1.0 μm and an optical waveguide in the Si photonic lightwave circuit which has a MFD of 5.0 μm.

The effects of increasing the spot size as described above also include an effect of increasing the reflection loss and suppressing reflected harmful optical feedback. FIG. 9 illustrates dependence of the reflection loss on the optical waveguide angle in each of a Si optical waveguide which has a MFD of 1.0 μm and in which the spot size is hardly increased and the optical waveguide in the Si photonic lightwave circuit which has a MFD of 5.0 μm. The results illustrated in FIG. 9 is obtained by simply calculating a reflected beam of an incident beam in reflection (Gaussian coupling) on an interface between the optical waveguide in the Si photonic lightwave circuit and the adhesive and performing dB addition of perpendicular Fresnel reflection on the reflected beam.

The calculation conditions are such that the wavelength is 1.55 μm and the equivalent refractive index in an output portion of the optical waveguide in the Si photonic lightwave circuit is 1.455. These values are determined assuming that the reflection loss at the oblique angle of 5 degrees is 30 dB or more in the calculation of reflection. Moreover, the refractive index of the UV adhesive is 1.45 and the MFD of the output from the Si photonic lightwave circuit is 5.0 μm (spot size 2.5 μm).

As described above, when the MFD is increased, the reflection loss increases. Since a reflection loss of 30 dB or more is generally preferable, the waveguide angle needs to be set to 5 degrees or more.

An anti-reflection film (AR film) may be used to prevent reflection on such an end surface. However, the AR film is formed in multi-layer film formation in which the refractive index and the film thickness are strictly controlled, and requires high cost and long time. Moreover, since the AR film has wavelength dependence, a thin film matching the wavelength band to be used need to be formed. Meanwhile, in the method using the oblique waveguides in the present invention, there is no lens and the array can be connected as a whole. In addition, the method in the present invention provides an excellent reflection prevention effect at low cost without wavelength dependence.

<Si Photonic Lightwave Circuit-Optical Fiber, SSC Increase, Loss Reduction Effect>

Figure 10:
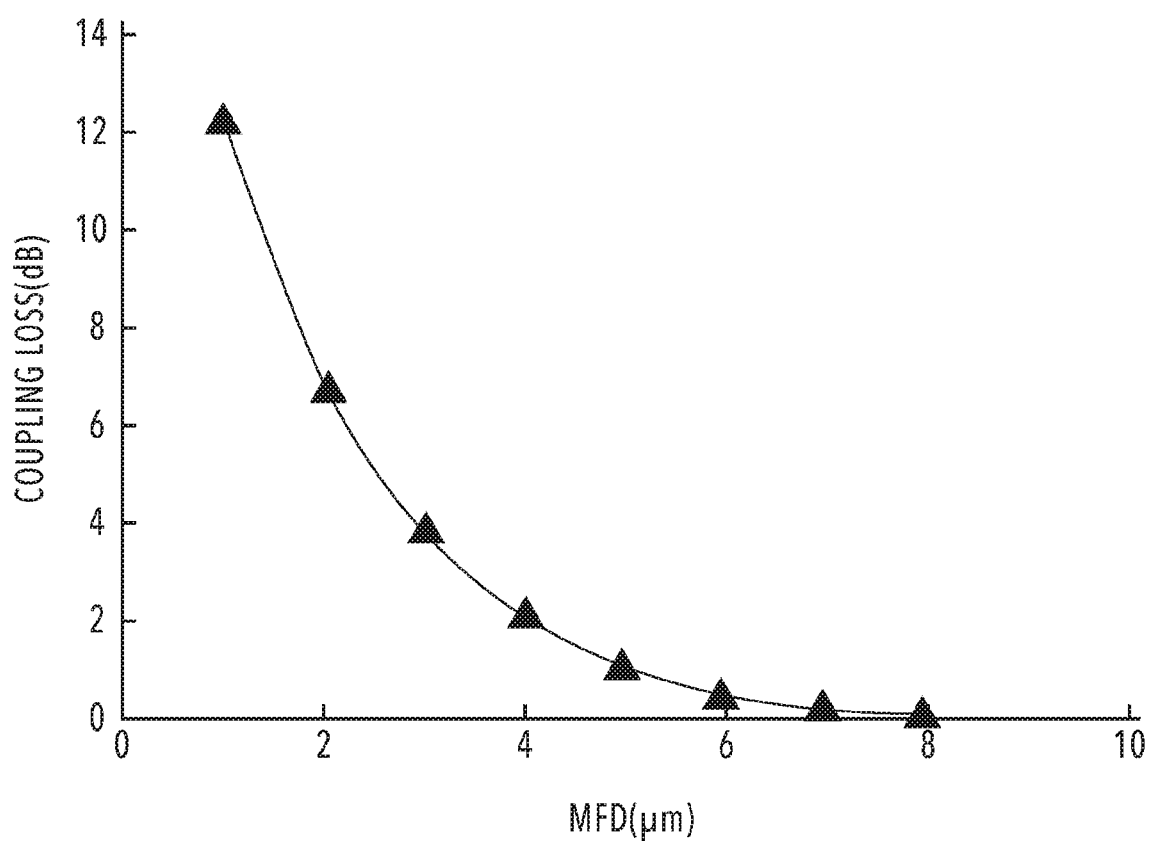
FIG. 10 is a view illustrating an effect of reducing a coupling loss by increasing the spot size of the optical waveguide in the Si photonic lightwave circuit.

FIG. 10 illustrates an effect of reducing the coupling loss by increasing the spot size of the optical waveguide in the Si photonic lightwave circuit. The calculation conditions are such that the wavelength is 1.55 μm, the spot size of the optical waveguide in the Si photonic lightwave circuit is 2.5 μm, the optical fiber spot size is 4.0 μm (typical value of a DSF fiber), and an interval between the Si photonic lightwave circuit and the optical fiber is 10 μm. Increasing the spot size as described above can greatly reduce the coupling loss.

REFERENCE SIGNS LIST 101 board
102, 105 package module
103 Si photonic lightwave circuit
104 optical fiber block
106 optical fiber array
201, 301-1, 302-2 chassis
202, 205, 302-1, 302-2, 305-1, 305-2 package module
203, 303-1, 303-2 Si photonic lightwave circuit
204, 304-1, 304-2 optical fiber block
206, 306-1, 306-2 optical fiber array
401 Si substrate
402 Si core
403 SiO2 cladding
1101 board
1102, 1105 package module
1103 Si photonic lightwave circuit
1104 optical fiber block
1106 optical fiber array

The invention claimed is:

1. An optical module comprising:
a Si photonic lightwave circuit including an optical waveguide formed of a Si core and a $SiO_2$ cladding, the optical waveguide tilted on an output end surface at an oblique angle with respect to a direction perpendicular to the output end surface; and
an optical fiber block fixing an optical fiber array at the same oblique angle as the optical waveguide,
wherein a center of the optical waveguide on the output end surface is shifted from a center of a side surface of the Si photonic lightwave circuit including the output end surface in a direction to which the optical waveguide is tilted, and
the optical fiber array is bended between a second module and the optical module on which the Si photonic lightwave circuit is mounted such that the optical fiber array does not overlap the second module, wherein the optical module and the second module are mounted on a board and arranged such that the second module faces the side surface including the output end surface.

2. The optical module according to claim 1, wherein the output end surface of the optical waveguide in the Si photonic lightwave circuit is perpendicular to a mount surface of the Si photonic lightwave circuit.

3. The optical module according to claim 1, wherein the optical waveguide in the Si photonic lightwave circuit is an optical waveguide array in which a plurality of optical waveguides are arranged parallel to each other.

4. The optical module according to claim 1, wherein the optical waveguide in the Si photonic lightwave circuit includes a spot size increasing portion formed of a tapered portion in which a width of the Si core decreases toward the output end surface.

5. The optical module according to claim 1, wherein the oblique angle is 5 degrees or more and 50 degrees or less.

6. The optical module according to claim 4, wherein the optical waveguide in the Si photonic lightwave circuit includes a waveguide with a constant width at a front end of the tapered portion in which the width of the Si core decreases toward the output end surface.

7. The optical module according to claim 1, wherein the output end surface of the optical waveguide in the Si photonic lightwave circuit is perpendicular to a mount surface of the Si photonic lightwave circuit.

8. The optical module according to claim 1, wherein the optical waveguide in the Si photonic lightwave circuit is an optical waveguide array in which a plurality of optical waveguides are arranged parallel to each other.

9. The optical module according to claim 1, wherein the optical waveguide in the Si photonic lightwave circuit includes a spot size increasing portion formed of a tapered portion in which a width of the Si core decreases toward the output end surface.

10. The optical module according to claim 1, wherein the oblique angle is 5 degrees or more and 50 degrees or less.

* * * * *